Patented Sept. 30, 1952

2,612,499

UNITED STATES PATENT OFFICE 2,612,499

PROCESS FOR THE PRODUCTION OF CHONDROITIN POLYSULFURIC ACID ESTERS

Robert Pulver, Basel, Switzerland, assignor to J. R. Geigy A. G., Basel, Switzerland, a Swiss firm No Drawing. Application October 3, 1951, Serial No. 249,629. In Switzerland October 17, 1950

3 Claims. (Cl. 260—211.5)

It is known that by esterification of polysaccharides or polyuronic acids with sulphuric acid, substances can be obtained which hinder the coagulation of the blood both in vivo and in vitro and so have properties similar to those of the physiological antithrombin heparin. The restrictive action on the coagulation of the blood of some of these synthetic products approaches that of heparin. They are, however, definitely more toxic than heparin which fact strongly prejudices their use in therapy.

Up to the present these sulphuric acid esters have been produced solely by sulphating the basic substance with chlorosulphonic acid in pyridine. Other known sulphating methods produce inactive preparations. The sulphation must be performed in such a manner that a high content of sulphur is attained without a substantial diminution in the length of the chain occurring at the same time, i. e. a decomposition of the polysaccharide or polyuronic acid, as it is known that products having a low sulphur content or low molecular weight are only slightly active and only slightly influence the coagulation of the blood.

The sulphation under suitable reaction conditions of different polysaccharides and polyuronic acids with chlorosulphonic acid in pyridine provides products which have a restrictive action on the coagulation. Such products are e. g. the chondroitin polysulphuric acid esters which were first produced in this manner by S. Bergström (Hoppe-Seylers, Z. physiol. Chem. 238, 163 (1936)) by sulphation of chondroitin sulphuric acid (chondroitin sulphuric acid ester).

The process was further elaborated by P. Karrer, H. König and Ed. Usteri (Helv. chim. Acta 26, 1309 (1943)) for the production of chondroitin polysulphuric acid esters. According to these authors, products are so obtained with a sulphur content which varies between 8.5 and 11.5%. Products which have a lower sulphur content must be after-sulphated in a second process before they can be worked up.

In preparing non-toxic injectable preparations according to this process, particular care must be taken in separating the exceedingly toxic pyridine which is bound through the chondroitin polysulphuric acid ester partly by salt formation and is also partly adsorbed as a result of the colloidal character of the polysulphuric acid ester. Operations which are very laborious and in addition have an adverse influence on the yield of active substance, therefore, must be performed to separate this dangerous substance. Many purifying processes have been used, mainly dialysis which needs a great deal of time and purification by means of barium salt and brucine salt.

It has now been found that chondroitin polysulphuric acid esters having a good restrictive action on the coagulation of the blood and low toxicity can be prepared by treating chondroitin sulphuric acid in formamide with chlorosulphonic acid at a low temperature. It is advantageous to prepare a mixture of chlorosulphonic acid and formamide in advance. On adding chondroitin sulphuric acid to such a mixture of suitable composition a complete esterification occurs in a few hours at room temperature. In this way, a product is obtained which has a sulphur content of over 13% so that no after-sulphation is necessary. The ratio of chlorosulphonic acid to formamide in the mixture used for sulphation is of importance with regard to the rapidity of the reaction and the yield of active substance. If the reaction is performed at a temperature of 10–25° C. then the optimal ratios have been found to be 15:100 to 22:100 parts by volume. Mixtures of e. g. 14:100 or 25:100 parts by volume have been found to produce lower yields. Because of the solidification of the formamide or of the formamide/chlorosulphonic acid mixture, the lowest reaction temperature is limited to about 0°. The sulphation proceeds more rapidly at temperatures of over 25° but the decomposition of the formamide by the chlorosulphonic acid becomes more and more noticeable so that the highest possible reaction temperature is about 40°. The amount of the chlorosulphonic acid/formamide mixture is so chosen that the chondroitin sulphuric acid or polysulphuric acid esters are dissolved therein and the result is a homogeneous reaction mixture.

The chondroitin polysulphuric acid ester can be easily isolated, e. g. by pouring the reaction mixture into alcohol. The ester then precipitates and can be separated by filtration and washed. In this way, a practically complete separation from the other components of the reaction mixture is obtained. Further operations to remove the adsorptively bound accompanying substances are superfluous as these are quite harmless and, in the amounts in which they occur, have no effect on the toxicity of the reaction products.

It has been found that the chondroitin sulphuric acid esters or their sodium salts produced according to the new process have the same restrictive activity on the coagulation of the blood as the best preparations produced by sulphation in pyridine which have been described in the literature. They are, however, considerably less toxic. On intravenous application of the preparations produced according to the present process, the DL 50 (mouse) is about 1.0 g./kg. whereas that of the preparations known up to now is 0.25 g./kg.

The new process is not only a considerable simplification of the previous processes, particularly in the working up, but also most surprisingly provides a different type of product. The products according to the invention are of greatly reduced toxicity while having the same activity as the previously known products and their toxicological properties as well as their physiological properties regarding the coagulation of the blood very closely approach those of the heparin preparations used in therapy.

The following example illustrates the invention.

*Example*

20 parts by volume of chlorosulphonic acid are added to 100 parts by volume of formamide in a flask with a stirrer attached under ice cooling. 10 parts of the sodium salt of chondroitin sulphuric acid are added and the temperature is kept at 20–25° C. After 3 hours, the mixture is poured into 500 parts by volume of methanol and the precipitated chondroitin sulphuric acid ester is filtered off after which it is washed with methanol and ether. About 12 parts by volume of ester are obtained with a sulphur content of 13%. The ester is snow-white in colour. Salts which dissolve well in water with a neutral reaction and are only slightly toxic can be obtained by known methods by reacting with alkalies.

What I claim is:

1. A method of preparing chondroitin polysulphuric acid which comprises reacting chondroitin sulphuric acid with chlorosulphonic acid in formamide at a temperature between the solidification temperature of the formamide-chlorosulphonic acid mixture employed and 40° C.

2. A method of preparing chondroitin polysulphuric acid which comprises reacting chondroitin sulphuric acid with a mixture of chlorosulphonic acid and formamide containing 100 parts of formamide to 15 to 22 parts of chlorosulphonic acid at a temperature between the solidification temperature of the formamide-chlorosulphonic acid mixture employed and 40° C.

3. A method of preparing chondroitin polysulphuric acid which comprises reacting chondroitin sulphuric acid with a mixture of chlorosulphonic acid and formamide containing 100 parts of formamide to 15 to 22 parts of chlorosulphonic acid at a temperature of 10–25° C.

ROBERT PULVER.

REFERENCES CITED

The following references are of record in the file of this patent:

Chem. Abst., v. 38 p. 2933. 1944 citing p. Karrer et al.

Helv. Chim. Acta, vol. 26, pages 1296–1315 (1945).